United States Patent Office 3,491,555
Patented Jan. 27, 1970

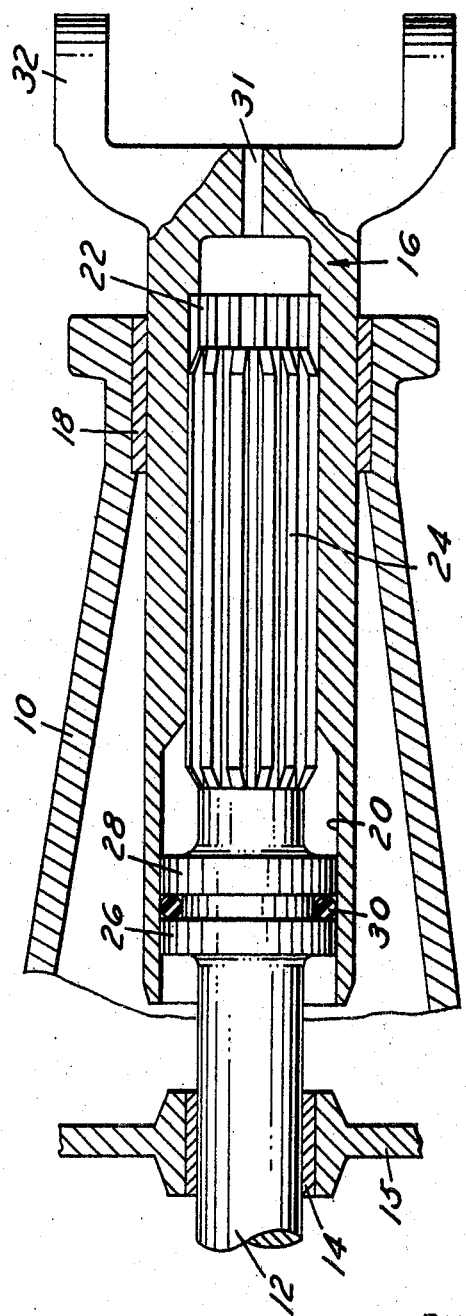

3,491,555
PILOTED SLIP SPLINE CONSTRUCTION
Phillip G. Arndt, Madison Heights, and Charles R. Halstead, Dearborn Heights, Mich., assignors to Ford Motor Company, Dearborn, Mich., a corporation of Delaware
Filed June 10, 1968, Ser. No. 735,725
Int. Cl. F16c *3/03;* E21b *17/02*
U.S. Cl. 64—23          1 Claim

ABSTRACT OF THE DISCLOSURE

A slip spline construction for a pair of shafts that are telescopically connected. The spline construction provides a driving connection between the shafts while permitting relative longitudinal displacement. One of the shafts has a radially extending portion spaced from the splines and engaging the other shaft. The radially extending portion forms a pilot that maintains the shafts in concentric relationship.

BACKGROUND OF THE INVENTION

In certain machinery, such as automative drivetrains, it is necessary to provide means to permit one shaft to be longitudinally displaced with respect to another shaft while maintaining a driving connection between the two shafts. For this purpose, internal and external mating splines are formed on the respective shafts. In prior art devices, the spline engagement is also relied upon to maintain concentricity between the shafts.

Due to manufacturing tolerances, clearances exist between the mating splines so that the shafts are not always maintained in proper concentric relationship. This clearance allows one of the shafts to cock into a skew position. The one shaft is permitted to orbit about an eccentric axis instead of rotating about its balance axis, and thereby, creating an unbalanced force and subsequent vibration. In the cocked position, the contact area between the spline teeth is very small causing extreme loading and precluding proper lubrication of the spline teeth. Poor lubrication, in turn, greatly increases the effort required for axial displacement between the shafts.

In view of the state of the art, it is the principal object of the present invention to provide a connection between two shafts that maintains the shafts in concentric relationship and reduces the loading on the spline teeth.

BRIEF SUMMARY OF THE DISCLOSURE

In accordance with the presently preferred embodiment of this invention, a first shaft has an externally splined portion and a second shaft has an internal bore with a portion of the bore having splines. The two shafts are telescopically related with their respective spline teeth in engagement and providing a driving connection. The internal shaft has an outwardly extending radial portion that engages the internal wall of the bore of the other shaft. The engagement between the radially extending portion and the second shaft maintains the two shafts concentric about their common axis. With this construction, the splines function merely as a means for providing a driving connection and are not relied upon for maintaining concentricity.

BRIEF DESCRIPTION OF THE DRAWINGS

The many objects and advantages of the present invention will become apparent from the following description and the accompanying drawing, in which the single drawing figure is an elevational view partly in section of a portion of an automobile drivetrain construction.

DETAILED DESCRIPTION OF THE DISCLOSURE

The drawing shows the invention embodied in the drivetrain of a vehicle, however, it is usable in other applications and this construction is shown for illustrative purposes only. In the single view, an automotive housing 10 has an output shaft 12 that receives power from transmission gearing and an automotive engine. A bushing 14 is connected to a web portion 15 of the housing 10 and rotatably supports the transmission output shaft 12. A second shaft 16 is rotatably supported within the housing 10 by means of a bushing 18.

Means are provided for drivingly connecting shaft 16 to shaft 12. Shaft 16 has an internal bore 20, a portion 22 of which has longitudinally extending spline teeth. Shaft 12 has spline teeth 14 formed to engage the teeth 22 of shaft 16. The engagement of the spline teeth 22 and 24 permits driving torque to be transmitted from shaft 12 to shaft 16. The splines also permit the shaft 16 to be displaced axially with respect to shaft 12 as may be required by movement of the vehicle's driveshaft and rear axle.

Spaced from the end of the shaft 12, a pair of radially outwardly extending lands 26 and 28 engage the interior wall of the bore 20. A groove is formed between the lands 26 and 28 to accommodate a seal 30. The seal 30 forms a fluid type connection between the shafts 12 and 16. A vent 31 is formed in the shaft 16 to maintain the interior of bore 20 at atmospheric pressure. The creation of a vacuum in the bore 20 during axial movement of the shaft 16 would inhibit such displacement.

The right-hand end of the shaft 16 is provided with a yoke 32 for connecting the shaft 16 to the elements of a universal joint. In the typical automotive application, this universal joint provides an articulated connection between the transmission output and the vehicle driveshaft which is joined to the rear axle.

OPERATION

In accordance with the present invention, the lands 26 and 28 engage the internal surface of the bore 20 and function to maintain the shaft 12 concentric with respect to the shaft 16. With this construction, the splines 22 and 24 serve to maintain the shafts 12 and 16 in driving engagement, however, they are not relied upon to maintain concentricity.

This construction prevents the cocking of the shaft 16 with respect to shaft 12. With this construction, concentricity of the shafts 12 and 16 is not adversely affected by excessive clearance between the spline teeth 22 and 24.

The foregoing description presents the presently preferred embodiment of this invention. Modifications and alterations may occur to those skilled in the art that will come within the scope and spirit of the following claim.

We claim:

1. A piloted slip spline construction for an automotive drivetrain comprising a transmission housing, a transmission output shaft rotatably supported by said housing, a drive shaft telescopically engaging said output shaft, bearing means rotatably supporting said drive shaft on said housing, said transmission output shaft having an externally splined portion, said drive shaft having first and second bore portions, said first bore portion being internally splined and in driving engagement with the splined portion of said transmission output shaft, said second bore portion having a cylindrical wall of greater diameter than said first bore portion, said transmission output shaft having a pair of radially extending axially spaced lands slidably engaging said second bore portion, an O-ring seal disposed between said lands and sealingly engaging said second bore portion, said lands being constructed to maintain said shafts in concentric relationship.

References Cited

UNITED STATES PATENTS

| | | | |
|---|---|---|---|
| 2,116,290 | 5/1938 | Spicer | 64—23 |
| 3,410,355 | 11/1968 | Garrett | 64—23 X |

FOREIGN PATENTS

| | | |
|---|---|---|
| 636,304 | 4/1950 | Great Britain. |

FRED C. MATTERN, Jr., Primary Examiner

WESLEY S. RATLIFF, Jr., Assistant Examiner

U.S. Cl. X.R.

175—321